D. W. Canfield.
Suspenders.
No. 2299
Reissued Jul. 10, 1866.
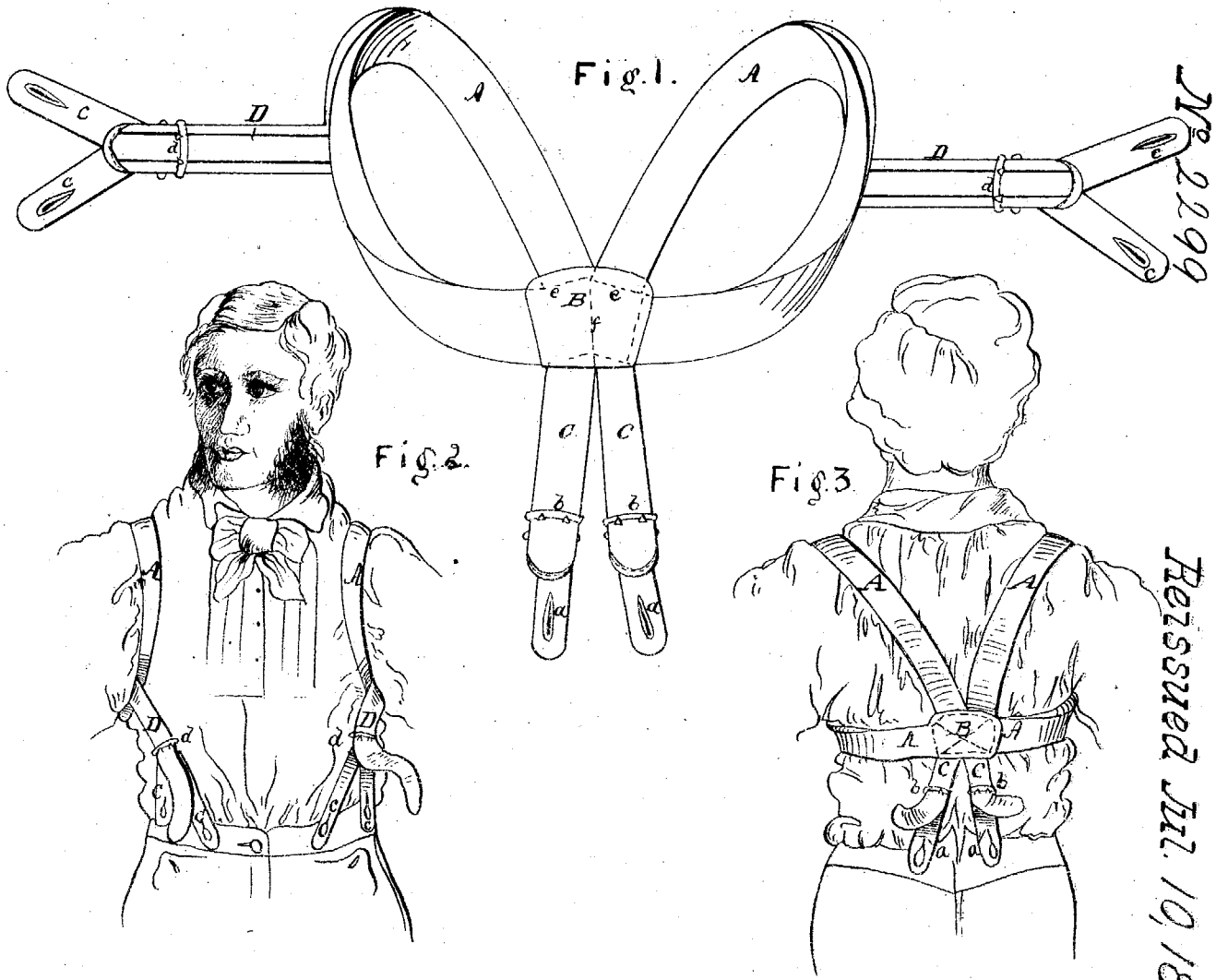
Witnesses
Timothy Shine
W. S. Partridge
Inventor.
D. W. Canfield

UNITED STATES PATENT OFFICE.

DAVID W. CANFIELD, OF NEW YORK, N. Y.

IMPROVEMENT IN COMBINED SHOULDER-BRACE AND SUSPENDERS.

Specification forming part of Letters Patent No. 37,149, dated December 16, 1862; Reissue No. 2,299, dated July 10, 1866.

*To all whom it may concern:*

Be it known that I, DAVID W. CANFIELD, of No. 486 Broadway, in the city, county, and State of New York, have invented a new and useful Improvement in a Combined Shoulder-Brace and Suspenders; and I do hereby declare that the following is a full, clear, and exact description of the same, reference being had to the accompanying drawings, forming part of this specification, in which—

Figure 1 is a plan view of a shoulder-brace and suspenders with my improvement, representing them spread out to illustrate the invention. Figs. 2 and 3 are, respectively, a front and a back view, showing the application of the invention.

Similar letters of reference indicate corresponding parts in the several figures.

This invention consists in a novel mode of arranging and combining the several straps and pieces of which the combined shoulder-brace and suspender is composed, whereby it is made to serve as an effective shoulder-brace and to support the pantaloons or other garment with greater ease and comfort to the wearer than with the arrangement of parts in common use, and is rendered more perfectly adjustable.

To enable others to construct and apply my invention, I will proceed to describe its construction and operation.

A A are the shoulder straps or braces, each made of a separate piece of elastic webbing, which at their several ends are united by sewing, as shown at *e f* in Fig. 1, and have this union strengthened by sewing onto or over them a piece of stout cloth, B, that, when the shoulder-braces are worn, comes in the middle of the back at a point below or corresponding with a line drawn across the back from one armpit to the other, as shown in Fig. 2; or, in other words, the lower parts of the shoulder-straps A pass horizontally, or nearly so, across the back.

C C are the back-straps, sewed to the lower parts of A A at or near the point at which they are joined together, the union of which straps with A A is further strengthened by stitching the piece B.

D D are the front straps, sewed to the front parts of the shoulder-straps in a suitable position for the suspension of the front part of the garment to them.

The front and back straps are both provided with end pieces (respectively marked *a a* and *c c*) which, by means of buckles *b b* and *d d*, are both susceptible of adjustment so as to vary their effective length, the end pieces, *c c*, of the front straps being made double.

The back straps, C C, like the shoulder-straps or braces, should be made of elastic webbing; but the front straps may be made of an inelastic material, or any material but slightly elastic.

In wearing the combined shoulder-brace and suspenders herein above described it is put on by running each arm through its proper shoulder-brace and then buttoning the back straps to the back part of the pants or other garment, and its front straps to the front part of the same, first, however, having adjusted their end pieces to the proper and requisite lengths, when, as is obvious, not only will such garment be held in proper position upon the person, but at the same time, by my peculiar manner of connecting the shoulder-braces together, and to them the back straps, the shoulders will be both drawn down and back and there held, and thus perfectly braced, as desired, while at the same time, by the elasticity of the webbing of which the several straps are composed, they will be comfortable and easy to the wearer.

Among the many advantages of my improved shoulder-braces and suspenders combined may be here mentioned, that in construction they are exceedingly simple, can be put on and taken off with the utmost facility and ease, are readily adjusted to the wearer, and, when worn, produce no uncomfortable feelings to the wearer.

With most combined shoulder-braces and suspenders heretofore invented and patented, especially that described and embraced in the schedule annexed to the Letters Patent granted to B. J. Greeley under date of June 1, A. D. 1858, much difficulty and trouble has been experienced in using them, owing to the manner in which the several straps composing them were connected together, &c., and, besides, they were expensive to manufacture, and thus not adapted for general introduction.

To more fully indicate the difference between my combined shoulder-brace and suspenders and that patented by B. J. Greeley, and hereinbefore referred to, and to more fully show its superiority over the same, it may be well to here remark that in Mr. Greeley's patent, owing to the manner in which the shoulder-braces and back straps were connected together, in order to produce the desired effect upon the shoulders it was necessary to use a cross-strap in addition, as a connection between the two back straps, at or near the points where they joined the brace-straps, which, as is well known, not only complicated the shoulder-brace, thus making it expensive to manufacture, but also rendered it difficult and inconvenient to adjust upon the person—two very important disadvantages. By my invention, however, this cross-strap is dispensed with, and thus the shoulder-brace simplified, and, besides, a much more perfect, easy, and complete shoulder-brace produced.

What I claim as my invention, and desire to secure by Letters Patent, is—

A combined shoulder-brace and suspenders in which the ends of the strap A unite in the rear, at which point of junction the back straps are secured, substantially as described and for the purpose specified.

D. W. CANFIELD.

Witnesses:
ALBERT W. BROWN,
WM. TREWIN.